(12) United States Patent
Huang (10) Patent No.: US 8,245,990 B2
(45) Date of Patent: Aug. 21, 2012

(54) DISPLAY MOUNTING ASSEMBLY

(76) Inventor: Ming-Hsien Huang, Taipei Hsien (TW)

( * ) Notice: Subject to any disclaimer, the term of this patent is extended or adjusted under 35 U.S.C. 154(b) by 713 days.

(21) Appl. No.: 12/360,404

(22) Filed: Jan. 27, 2009

(65) Prior Publication Data
US 2009/0194655 A1 Aug. 6, 2009

(30) Foreign Application Priority Data
Feb. 1, 2008 (TW) .............................. 97202217 U (51) Int. Cl.
*E04G 3/00* (2006.01)
(52) U.S. Cl. ............... 248/276.1; 248/278.1; 248/279.1; 248/920; 361/679.21
(58) Field of Classification Search ............... 248/276.1, 248/917, 919–923, 277.1, 278.1, 279.1, 480, 248/485; 361/679.21
See application file for complete search history.

(56) References Cited

U.S. PATENT DOCUMENTS

| | | | |
|---|---|---|---|
| 7,395,996 B2 * | 7/2008 | Dittmer | 248/291.1 |
| 7,398,950 B2 * | 7/2008 | Hung | 248/276.1 |
| 7,438,269 B2 * | 10/2008 | Pfister et al. | 248/292.14 |
| 7,448,584 B2 * | 11/2008 | Chen et al. | 248/278.1 |
| 7,487,943 B1 * | 2/2009 | Gillespie | 248/282.1 |
| 7,513,474 B2 * | 4/2009 | Anderson et al. | 248/284.1 |
| 7,600,728 B2 * | 10/2009 | Petrick et al. | 248/286.1 |
| 7,648,112 B2 * | 1/2010 | Wu et al. | 248/282.1 |
| 7,793,903 B2 * | 9/2010 | Dittmer et al. | 248/276.1 |
| 7,832,700 B2 * | 11/2010 | Ciungan | 248/324 |
| 7,984,888 B2 * | 7/2011 | Park | 248/281.11 |
| 2005/0133678 A1 * | 6/2005 | Dittmer | 248/274.1 |
| 2005/0152102 A1 * | 7/2005 | Shin | 361/681 |

* cited by examiner

*Primary Examiner* — Bradley Duckworth
(74) *Attorney, Agent, or Firm* — Frommer Lawrence & Haug LLP; Ronald R. Santucci (57) ABSTRACT

A display mounting assembly includes: a wall bracket; a display-mounting bracket; and a position-adjusting mechanism disposed between and interconnecting the wall bracket and the display-mounting bracket, and including first and second connecting units and a supporting unit that is connected to the wall bracket. The first and second connecting units are provided on the display-mounting bracket and the supporting unit, respectively. Each of the first and second connecting units includes upper and lower connectors. The upper and lower connectors of the second connecting unit cooperatively define a circumferentially extending track. The upper and lower connectors of the first connecting unit are mounted slidably on the upper and lower connectors the second connecting unit so as to be co-slidable along the circumferentially extending track.

10 Claims, 10 Drawing Sheets

DISPLAY MOUNTING ASSEMBLY

CROSS-REFERENCE TO RELATED APPLICATIONS

This application claims priority of Taiwanese Application No. 097202217, filed on Feb. 1, 2008, the disclosure of which is incorporated herein by reference.

BACKGROUND OF THE INVENTION

1. Field of the Invention

This invention relates to a display mounting assembly, more particularly to a display mounting assembly including a position-adjusting unit for adjusting inclination of a display-mounting bracket relative to a wall bracket.

2. Description of the Related Art

Taiwanese Utility Model No. 540788 discloses a conventional display mounting assembly that includes a wall-mounting part for mounting on a wall, and a display-mounting part disposed in front of and connected to the wall-mounting part for supporting a display thereon. The display-mounting part is capable of being adjusted to be inclined relative to the wall-mounting part through a set of gears and a set of spring arm ratchets engaging the gears, respectively. However, such adjusting mechanism for adjusting the inclination of the display-mounting part is relatively complicated, and cannot provide sufficient strength to support the display when the display is large and relatively heavy.

SUMMARY OF THE INVENTION

Therefore, an object of the present invention is to provide a display mounting assembly with a position-adjusting unit that has a relatively simple structure and that is capable of providing sufficient strength to support the display having a large size and heavy weight.

According to this invention, there is provided a display mounting assembly that comprises: a wall bracket; a display-mounting bracket spaced apart from the wall bracket and adapted for mounting of a display thereon; and a position-adjusting mechanism disposed between and interconnecting the wall bracket and the display-mounting bracket, and including first and second connecting units and a supporting unit that is connected to the wall bracket. The first and second connecting units are provided on the display-mounting bracket and the supporting unit, respectively. Each of the first and second connecting units includes upper and lower connectors. The upper and lower connectors of one of the first and second connecting units cooperatively define a circumferentially extending track. The upper and lower connectors of the other of the first and second connecting units are mounted slidably on the upper and lower connectors of said one of the first and second connecting units so as to be co-slidable relative to said one of the first and second connecting units along the circumferentially extending track and so as to permit inclination adjustment of the display-mounting bracket relative to the wall bracket.

BRIEF DESCRIPTION OF THE DRAWING

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 5:
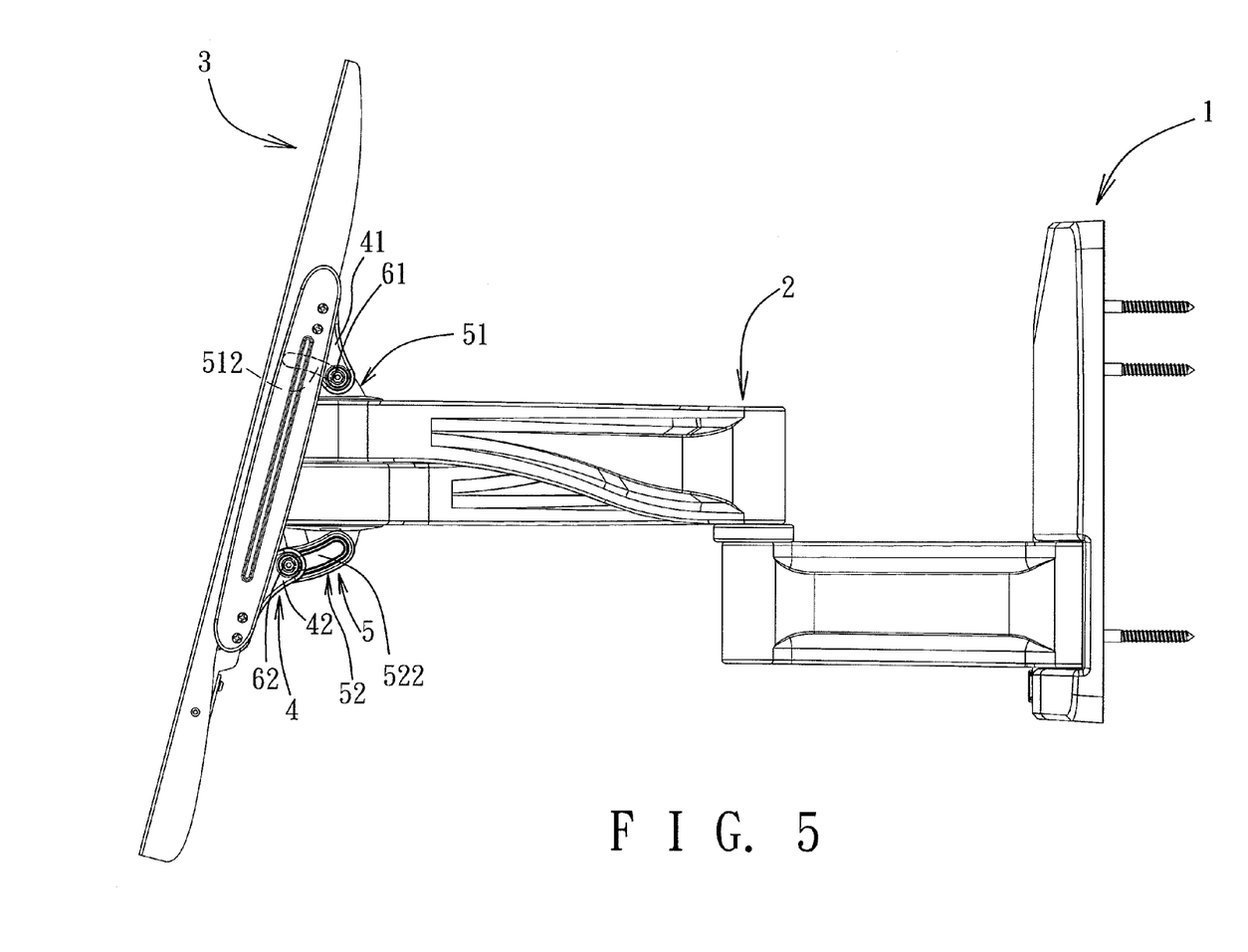
FIG. 5 is a schematic side view of the first preferred embodiment, illustrating a state where a display-mounting bracket is disposed at a first inclination angle relative to a wall bracket.
Figure 6:
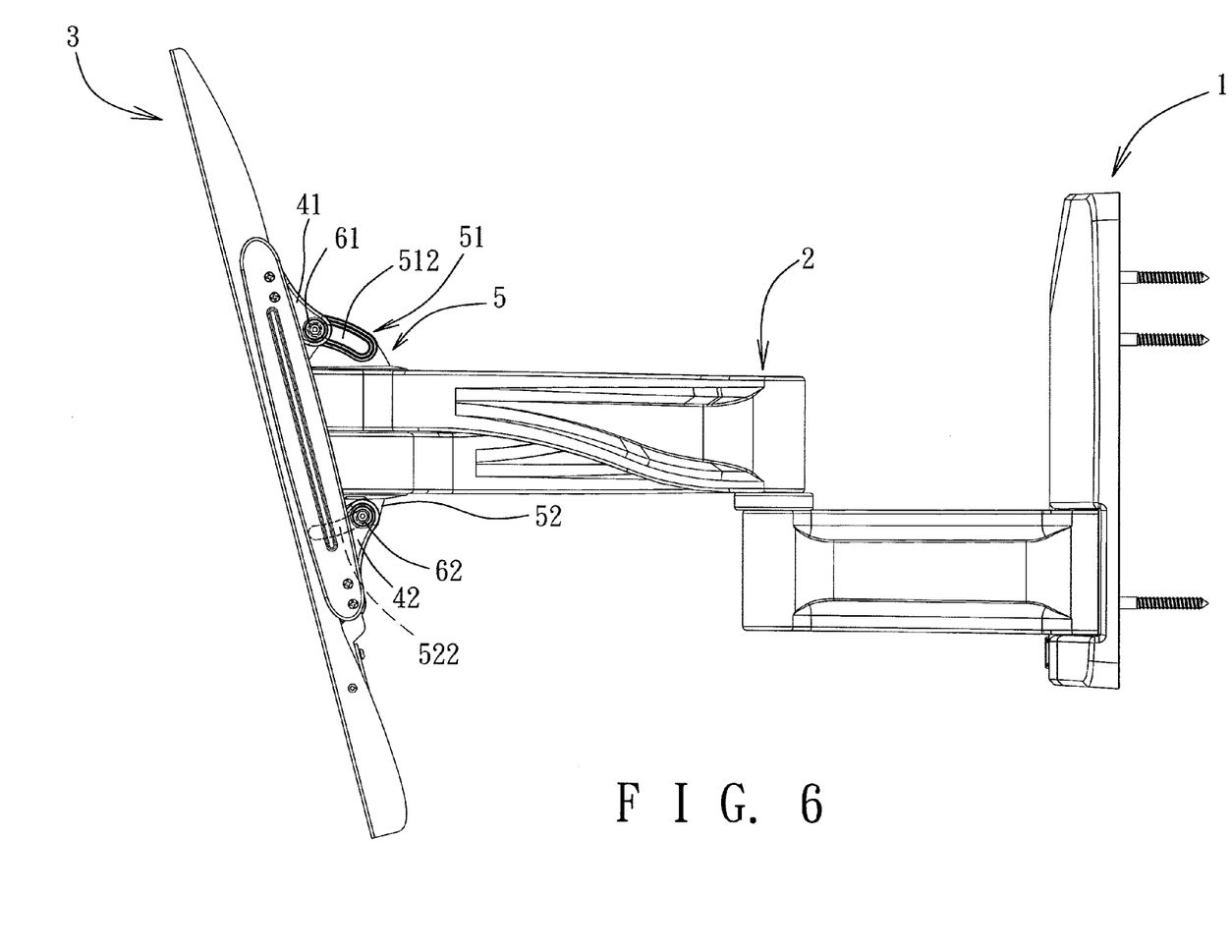
FIG. 6 is a schematic side view of the first preferred embodiment, illustrating another state where the display-mounting bracket is disposed at a second inclination angle relative to the wall bracket.

FIGS. 1 to 4 illustrate the first preferred embodiment of a display mounting assembly for mounting a display on a wall according to this invention. The display mounting assembly includes: a wall bracket 1; a display-mounting bracket 3 disposed in front of and spaced apart from the wall bracket 1 and adapted for mounting of a display (not shown) thereon; and a position-adjusting mechanism disposed between and interconnecting the wall bracket 1 and the display-mounting bracket 3, and including first and second connecting units 4, 5 and a supporting unit 2 that is connected to the wall bracket 1. The first and second connecting units 4, 5 are provided on the display-mounting bracket 3 and the supporting unit 2, respectively. Each of the first and second connecting units 4, 5 includes upper and lower connectors 41, 42, 51, 52. The upper and lower connectors 51, 52 of the second connecting unit 5 cooperatively define a circumferentially extending track 500. The upper and lower connectors 41, 42 of the first connecting unit 4 are mounted slidably on the upper and lower connectors 51, 52 of the second connecting unit 5 so as to be co-slidable relative to the second connecting unit 5 along the circumferentially extending track 500 and so as to permit inclination adjustment of the display-mounting bracket 3 relative to the wall bracket 1. FIG. 5 illustrates a state where the display-mounting bracket 3 is inclined at a first inclination angle relative to the wall bracket 1 such that the distance between a top end of the display-mounting bracket 3 and the wall bracket 1 is less than that between a bottom end of the display-mounting bracket 3 and the wall bracket 1. FIG. 6 illustrates an opposite state where the display-mounting bracket 3 is inclined at a second inclination angle relative to the wall bracket 1 such that the distance between the top end of the display-mounting bracket 3 and the wall bracket 1 is greater than that between the bottom end of the display-mounting bracket 3 and the wall bracket 1.

Figure 1:
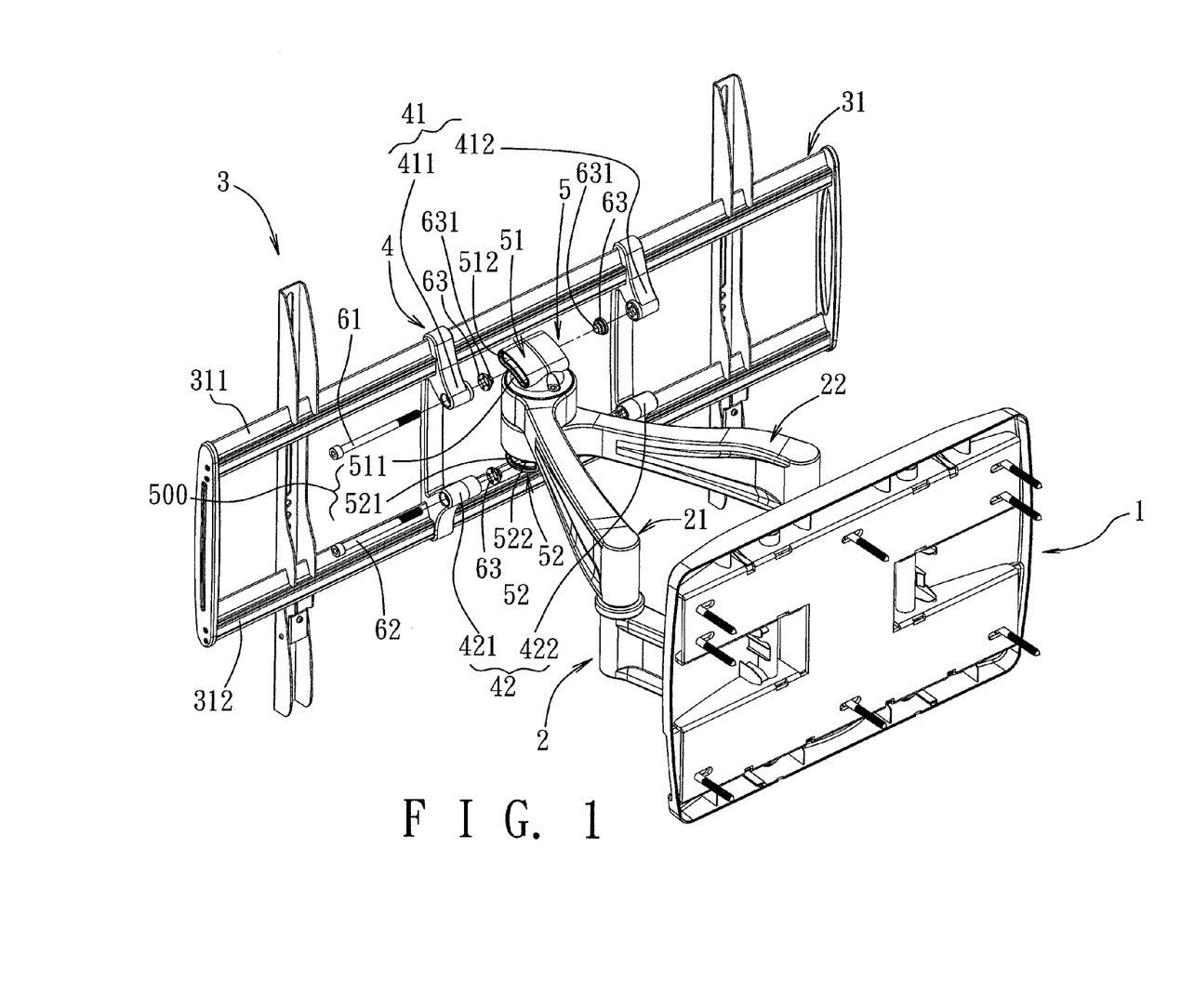
FIG. 1 is a perspective view of the first preferred embodiment of a display mounting assembly according to this invention, viewing from a rear side.
Figure 2:
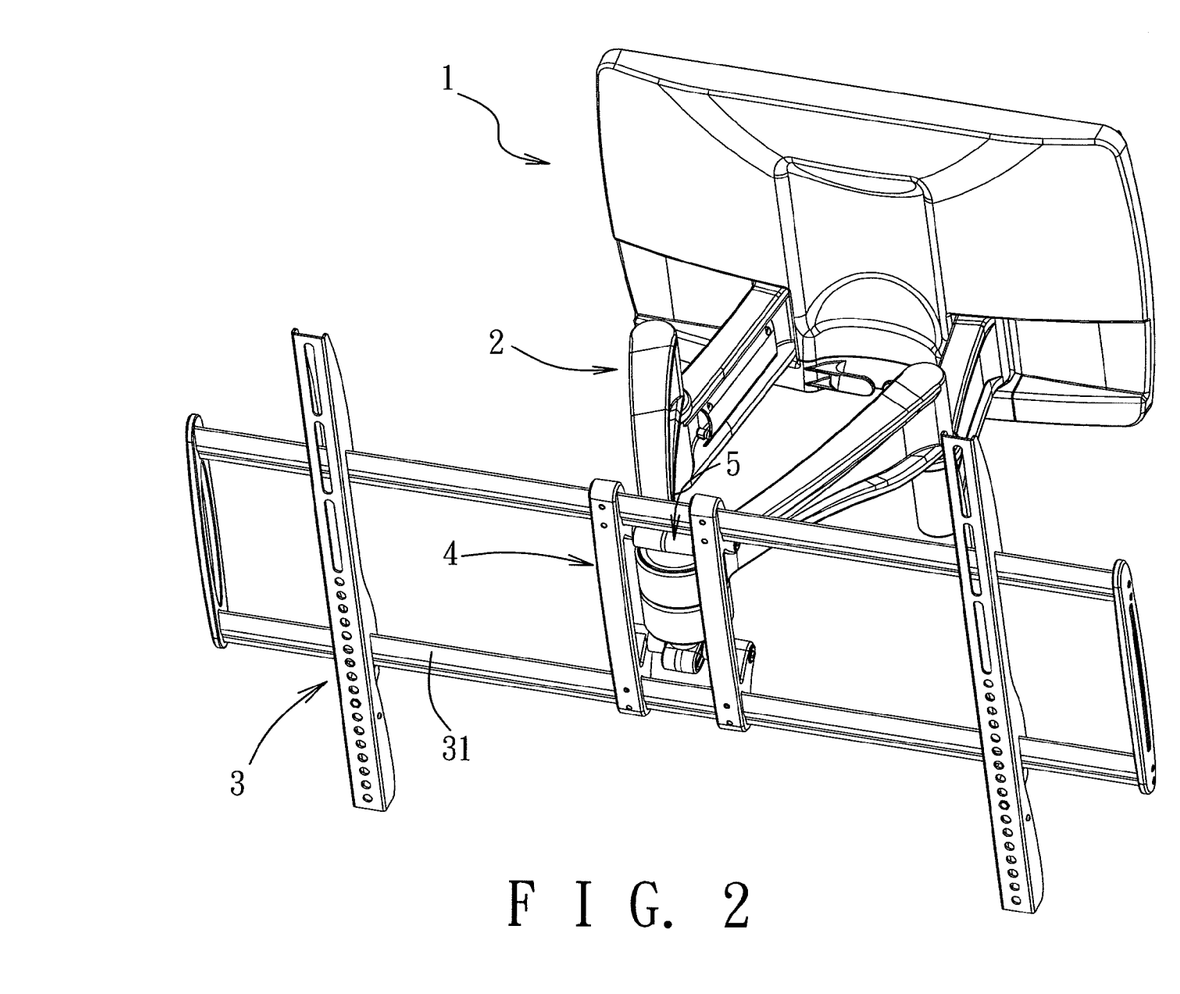
FIG. 2 is a perspective view of the first preferred embodiment, viewing from a front side.
Figure 3:
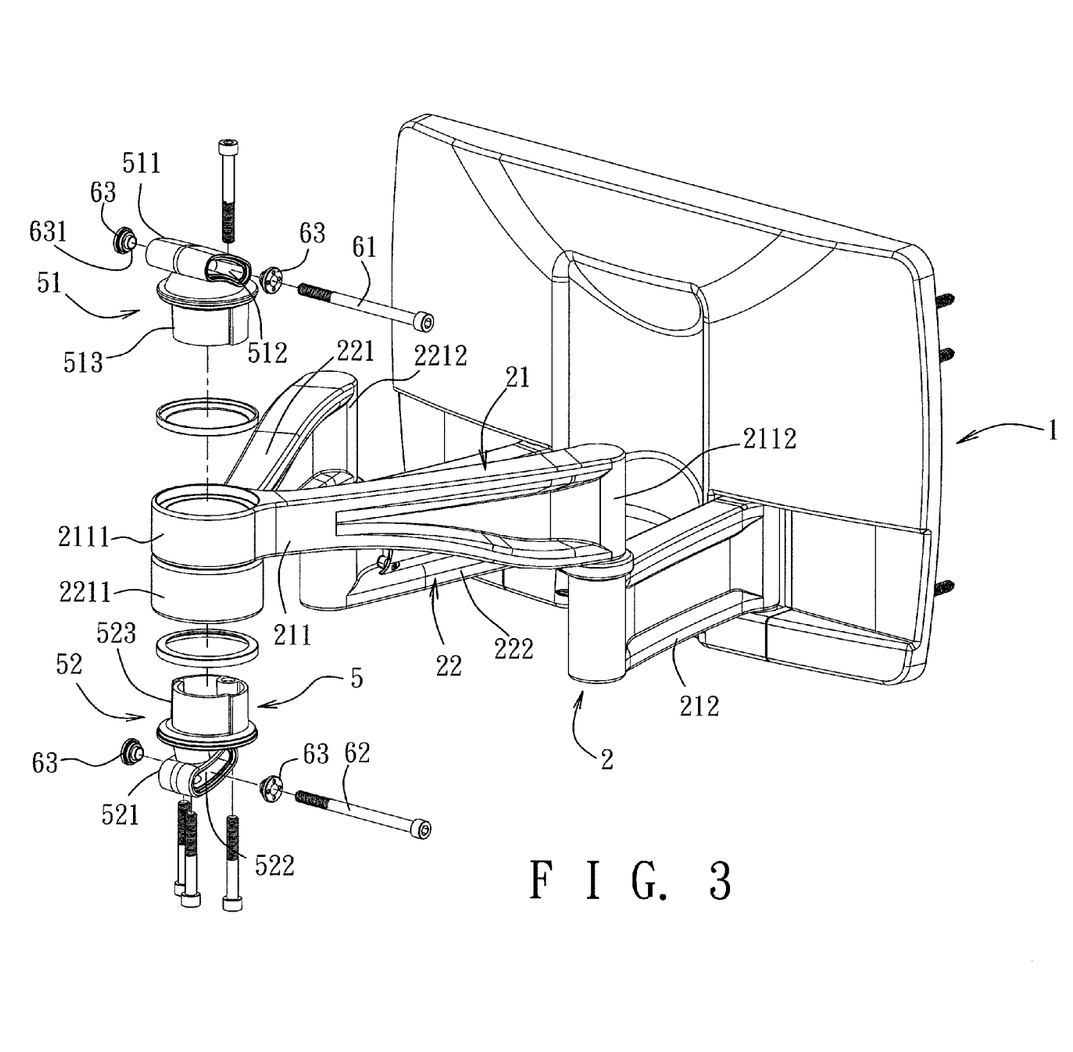
FIG. 3 is an exploded perspective view of the first preferred embodiment.
Figure 4:
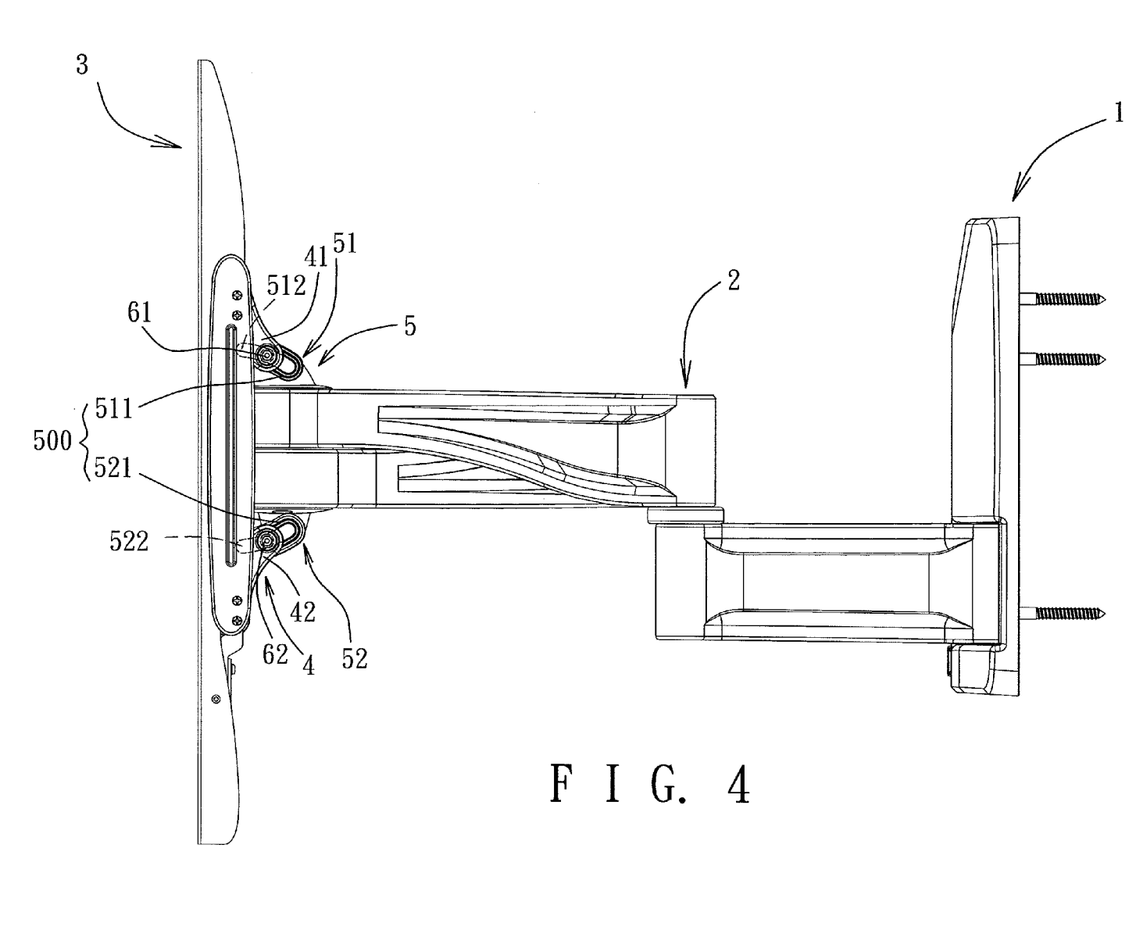
FIG. 4 is a schematic side view of the first preferred embodiment.

In this embodiment, the upper and lower connectors 51, 52 of the second connecting unit 5 have upper and lower slot-defining walls 511, 521 defining upper and lower arcuate slots 512, 522, respectively. The upper and lower slot-defining walls 511, 521 cooperatively define the circumferentially extending track 500, and limit inclination angle of the display-mounting bracket 3 relative to the wall bracket 1 to be within the aforesaid first and second inclination angles. Each of the upper and lower connectors 41, 42 of the first connecting unit 4 has left and right halves 411, 412, 421, 422 that are disposed respectively at two opposite sides of a respective one of the upper and lower slot-defining walls 511, 521. The left halves 411, 421 of the upper and lower connectors 41, 42 are connected integrally to each other. The right halves 411, 421 of the upper and lower connectors 41, 42 are connected integrally to each other. The position-adjusting mechanism further includes upper and lower bolts 61, 62, each of which extends through the left and right halves 411, 412, 421, 422 of a respective one of the upper and lower connectors 41, 42 of the first connecting unit 4 and through a respective one of the upper and lower arcuate slots 512, 521 of the upper and lower connectors 51, 52 of the second connecting unit 5, and each of which engages threadedly one of the left and right halves 412, 422 of the respective one of the upper and lower connectors 41, 42 of the first connecting unit 4.

The position-adjusting mechanism further includes upper and lower tightening units, each of which includes a pair of tightening bushes 63 located respectively to two opposite sides of a respective one of the upper and lower slot-defining walls 511, 521. Each of the tightening bushes 63 is made of an anti-wear plastic material, and has a diameter-reduced end portion 631. The tightening bushes 63 of each of the upper and lower tightening units are sleeved on a respective one of the upper and lower bolts 61, 62, and are press fitted within a respective one of the upper and lower arcuate slots 512, 522 at the diameter-reduced end portions 631, thereby permitting retaining of the display-mounting bracket 3 at a desired inclination angle relative to the wall bracket 1.

In this embodiment, the display-mounting bracket 3 includes a frame part 31 having upper and lower frame bars 311, 312. The upper and lower connectors 41, 42 of the first connecting unit 4 are mounted slidably and respectively on the upper and lower frame bars 311, 312 of the frame part 31.

Figure 7:
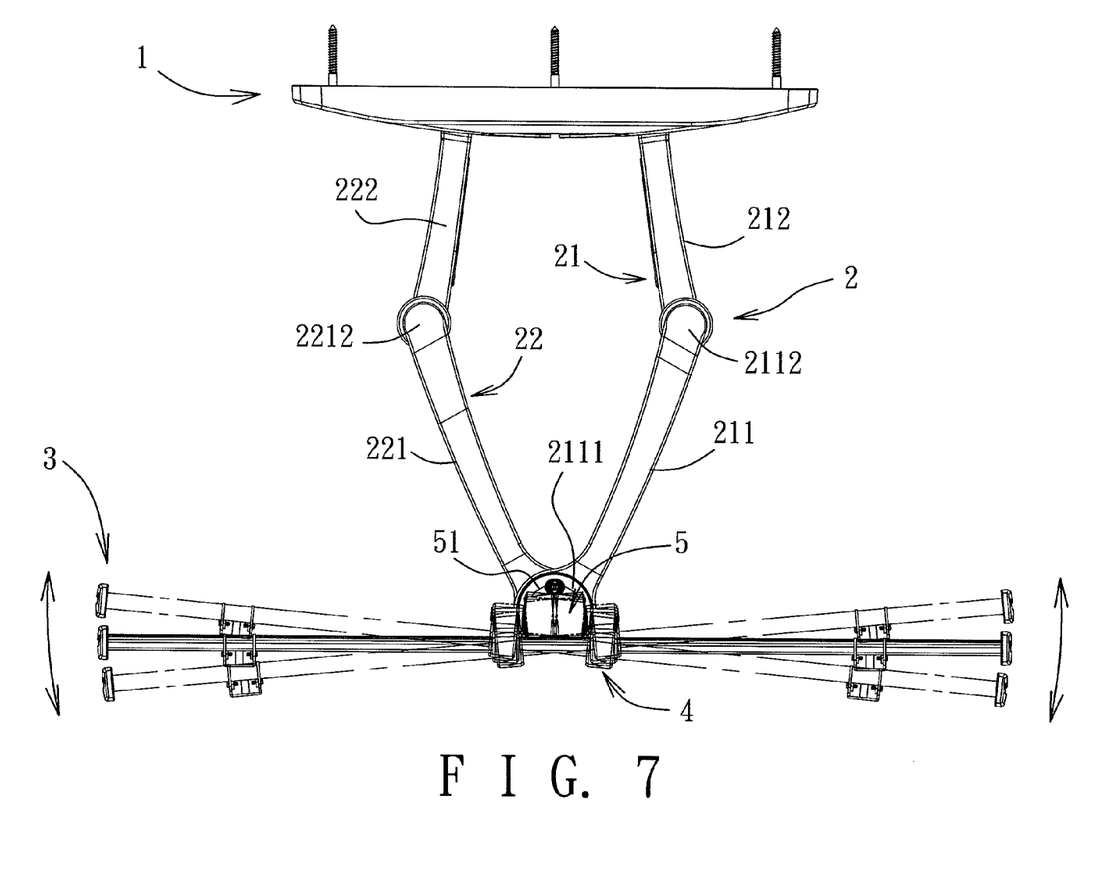
FIG. 7 is a schematic top view of the first preferred embodiment, illustrating how the display-mounting bracket rotates.

In this embodiment, the second connecting unit 5 is mounted rotatably on the supporting unit 2. The supporting unit 2 includes a pair of linkages 21, 22 connected to the wall bracket 1 and extending therefrom toward the display-mounting bracket 3. Each of the linkages 21, 22 includes a holding arm 211, 221 having a tubular pivot end 2111, 2211. The tubular pivot ends 2111, 2211 of the holding arms 211, 221 of the linkages 21, 22 are stacked one above the other. The upper and lower connectors 51, 52 of the second connecting unit 5 are secured to each other through fastening members, and further have upper and lower cylindrical parts 513, 523 extending from the upper and lower slot-defining walls 511, 521 toward each other and into the tubular pivot ends 2111, 2211 of the holding arms 211, 221 of the linkages 21, 22, respectively, so as to permit the second connecting unit 5 to be rotatable relative to the supporting unit 2 about the central axes of the upper and lower cylindrical parts 513, 523. The central axes of the upper and lower cylindrical parts 513, 523 are perpendicular to an axis of the circumferentially extending track 500 which is parallel to an axial direction of each of the upper and lower bolts 61, 62. FIG. 7, in combination with FIG. 3, illustrates how the display-mounting bracket 3 together with the second connecting unit 5 rotate relative to the supporting unit 2 and the wall bracket 1 about the central axes of the upper and lower cylindrical parts 513, 523.

Figure 8:
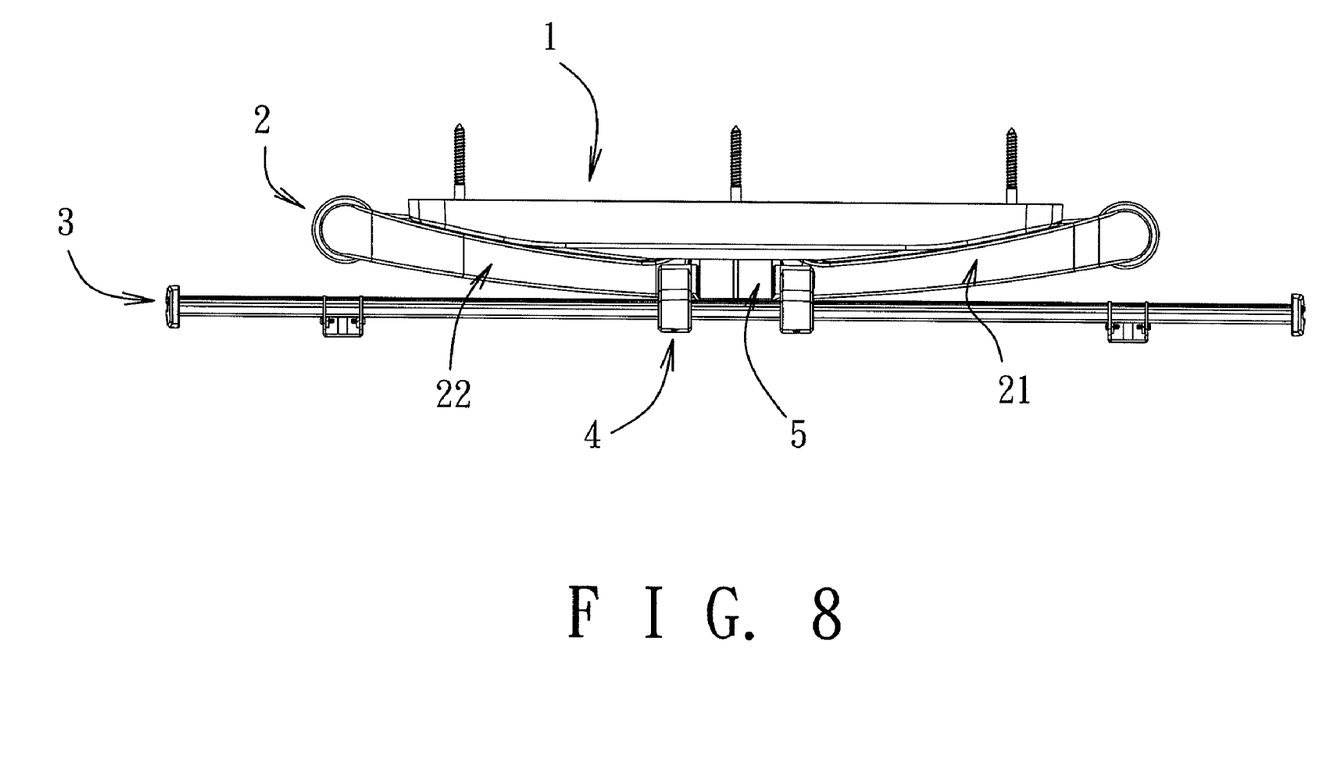
FIG. 8 is a schematic top view of the first preferred embodiment, illustrating a state where the display-mounting bracket is disposed at a position adjacent to the wall bracket.

The holding arm 211, 221 of each of the linkages 21, 22 further has a connecting end 2112, 2212 opposite to the tubular pivot end 2111, 2211. Each of the linkages 21, 22 further includes a connecting arm 212, 222 having one end pivoted to the connecting end 2112, 2212 of the holding arm 211, 221, and the other end pivoted to the wall bracket 1 so as to permit movement of the display-mounting bracket 3 toward and away from the wall bracket 1 in a direction perpendicular to the central axes of the upper and lower cylindrical parts 513, 523 and the axis of the circumferentially extending track 500. FIGS. 7 and 8 illustrate states where the display-mounting bracket 3 are disposed at positions distal from and adjacent to the wall bracket 1, respectively.

Figure 9:
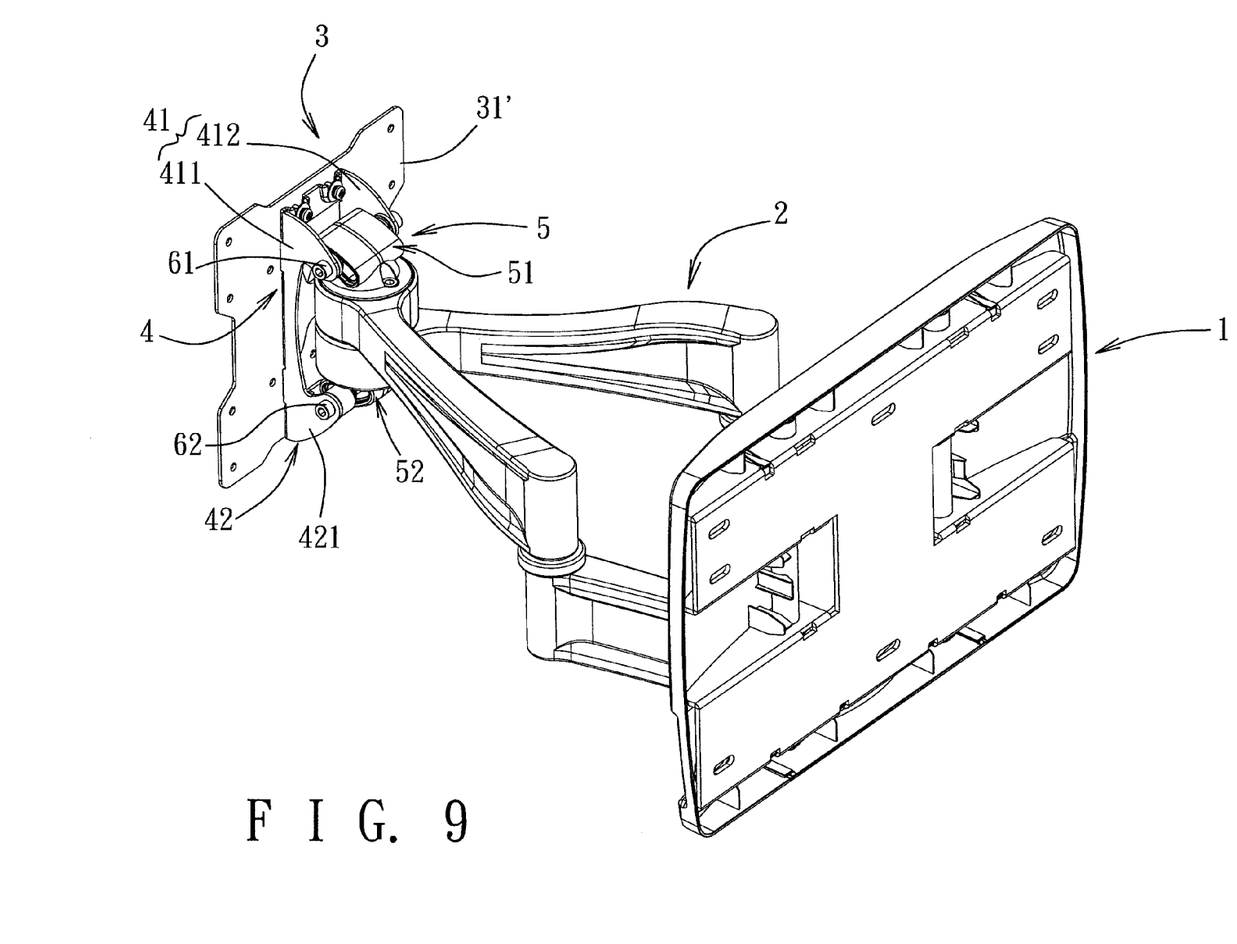
FIG. 9 is a perspective view of the second preferred embodiment of a display mounting assembly according to this invention.

FIG. 9 illustrates the second preferred embodiment of the display mounting assembly according to this invention. The second preferred embodiment differs from the previous embodiment in that the display-mounting bracket 3 of the second preferred embodiment is in the form of a mounting plate 31' for mounting of the display thereon through fastening means (not shown). The first connecting unit 4 is secured to the mounting plate 31' through a plurality of fasteners.

Figure 10:
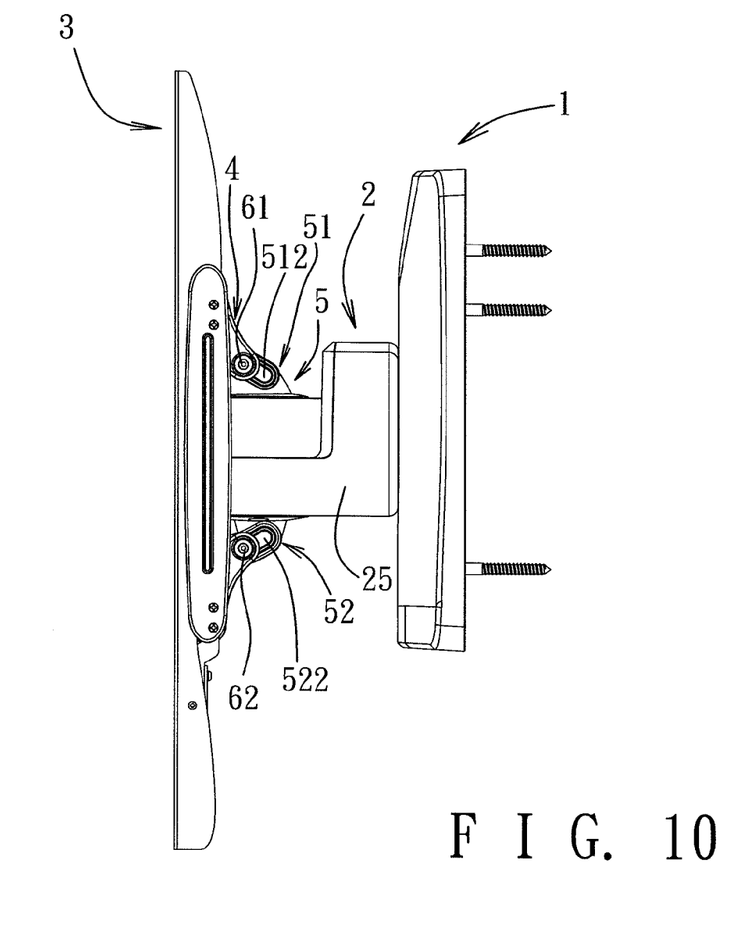
FIG. 10 is a schematic side view of the third preferred embodiment of a display mounting assembly according to this invention.

FIG. 10 illustrates the third preferred embodiment of the display mounting assembly according to this invention. The third preferred embodiment differs from the previous embodiments in that the supporting unit 2 of the third preferred embodiment includes a single link 25 secured to the wall bracket 1 and the display-mounting bracket 3. The second connecting unit 5 is secured to the link 25.

With the inclusion of the first and second connecting units 4, 5 in the display mounting assembly of this invention, the aforesaid drawbacks associated with the prior art can be alleviated.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A display mounting assembly comprising:
   a wall bracket;
   a display-mounting bracket spaced apart from said wall bracket and adapted for mounting of a display thereon; and
   a position-adjusting mechanism disposed between and interconnecting said wall bracket and said display-mounting bracket, and including first and second connecting units and a supporting unit that is connected to said wall bracket, said first and second connecting units being provided on said display-mounting bracket and said supporting unit, respectively, each of said first and second connecting units including upper and lower connectors, said upper and lower connectors of one of said first and second connecting units cooperatively defining a circumferentially extending track, said upper and lower connectors of the other of said first and second connecting units being mounted slidably on said upper and lower connectors of said one of said first and second connecting units so as to be co-slidable relative to said one of said first and second connecting units along said circumferentially extending track and so as to permit inclination adjustment of said display-mounting bracket relative to said wall bracket;

wherein said upper and lower connectors of said second connecting units have respectively tubular upper and lower slot-defining walls defining upper and lower arcuate slots, respectively, said upper and lower slot-defining walls cooperatively defining said circumferentially extending track, said position-adjusting mechanism further including upper and lower bolts, each of which is connected fixedly to a respective one of said upper and lower connectors of said first connecting unit and each of which extends through a respective one of said upper and lower arcuate slots of said upper and lower connectors of said second connecting units.

2. The display mounting assembly of claim 1, wherein:

each of said upper and lower connectors of said first connecting unit has left and right halves that are disposed at two opposite sides of a respective one of said upper and lower slot-defining walls; and each of said bolts extends through said left and right halves of a respective one of said upper and lower connectors of said first connecting unit, and engages threadedly one of said left and right halves of the respective one of said upper and lower connectors of said first connecting unit.

3. The display mounting assembly of claim 2, wherein said position-adjusting mechanism further includes upper and lower tightening units, each of which includes a pair of tightening bushes located respectively to the two opposite sides of a respective one of said upper and lower slot-defining walls, each of the tightening bushes having a diameter-reduced end portion, said tightening bushes of each of said upper and lower tightening units being sleeved on a respective one of said upper and lower bolts and being press fitted within a respective one of said upper and lower arcuate slots at said diameter-reduced end portions, thereby permitting retaining of said display-mounting bracket at a desired inclination angle relative to said wall bracket.

4. The display mounting assembly of claim 2, wherein said second connecting unit defines said circumferentially extending track.

5. The display mounting assembly of claim 4, wherein said display-mounting bracket includes a frame part, said first connecting unit being mounted slidably on said frame part.

6. The display mounting assembly of claim 4, wherein said second connecting unit is mounted rotatably on said supporting unit.

7. The display mounting assembly of claim 6, wherein said supporting unit includes a pair of linkages connected to said wall bracket and extending therefrom toward said display-mounting bracket, each of said linkages including a holding arm having a tubular pivot end, said tubular pivot ends of said holding arms of said linkages being stacked one above the other, said upper and lower connectors of said second connecting unit further having respectively upper and lower cylindrical parts extending respectively and integrally from said upper and lower slot-defining walls toward each other and into said tubular pivot ends of said holding arms of said linkages, respectively, so as to permit said second connecting unit to be rotatable relative to said supporting unit.

8. The display mounting assembly of claim 7, wherein said holding arm of each of said linkages further has a connecting end opposite to said tubular pivot end, each of said linkages further including a connecting arm having one end pivoted to said connecting end of said holding arm, and the other end pivoted to said wall bracket so as to permit movement of said display-mounting bracket toward and away from said wall bracket.

9. The display mounting assembly of claim 4, wherein said display-mounting bracket is in the form of a mounting plate, said first connecting unit being secured to said mounting plate.

10. The display mounting assembly of claim 1, wherein said supporting unit includes a tubular pivot end, said upper and lower connectors of said second connecting unit further having respectively upper and lower cylindrical parts extending respectively and integrally from said upper and lower slot-defining walls toward each other and into said tubular pivot end of said supporting unit, so as to permit said second connecting unit to be rotatable relative to said supporting unit.

\* \* \* \* \*